Aug. 25, 1936. C. S. BURNETT 2,052,277
SAFETY DEVICE FOR PNEUMATIC TIRE VEHICLES
Filed April 1, 1936 2 Sheets-Sheet 1
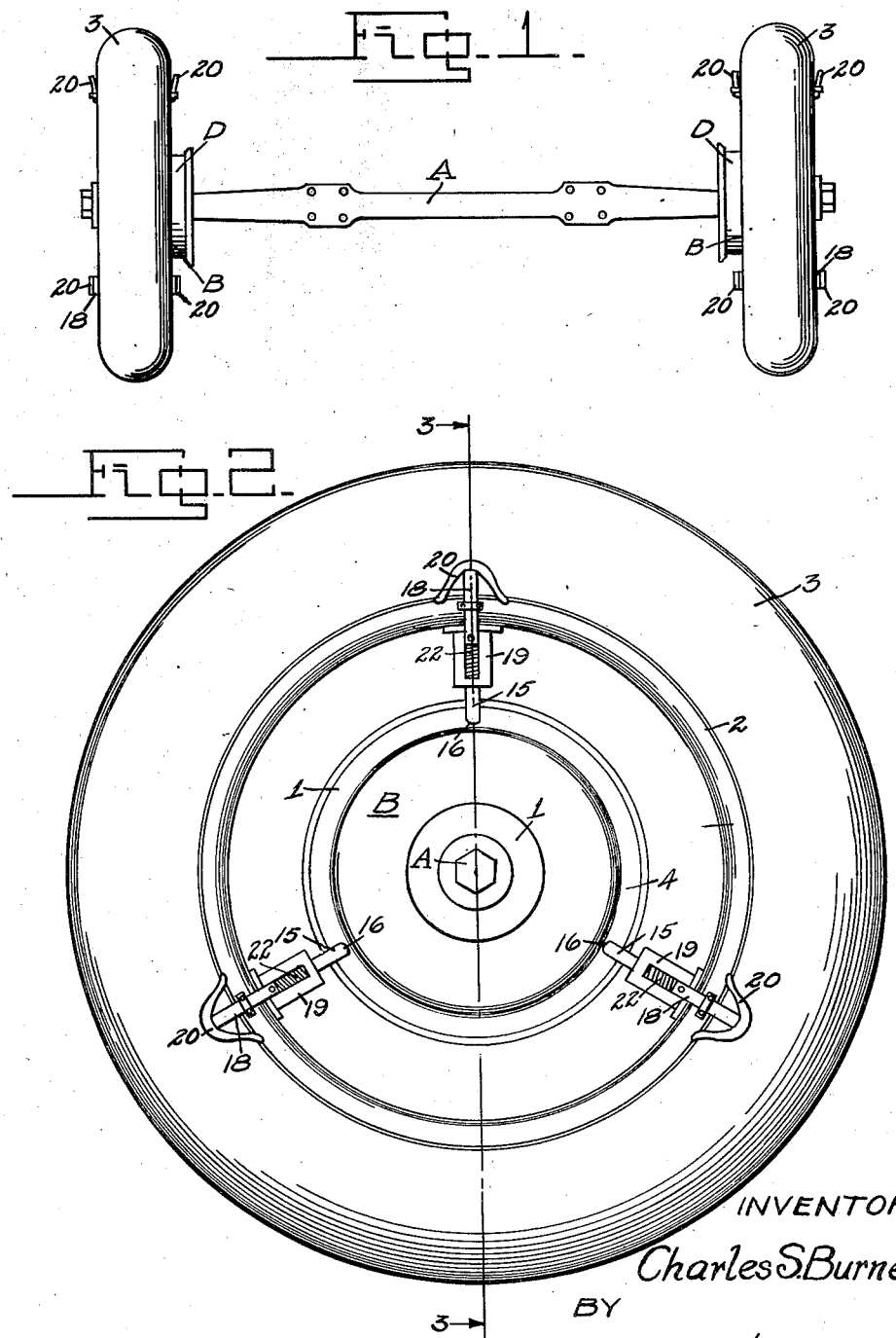
INVENTOR
Charles S. Burnett.
BY
Frank M. Halliday
ATTORNEY

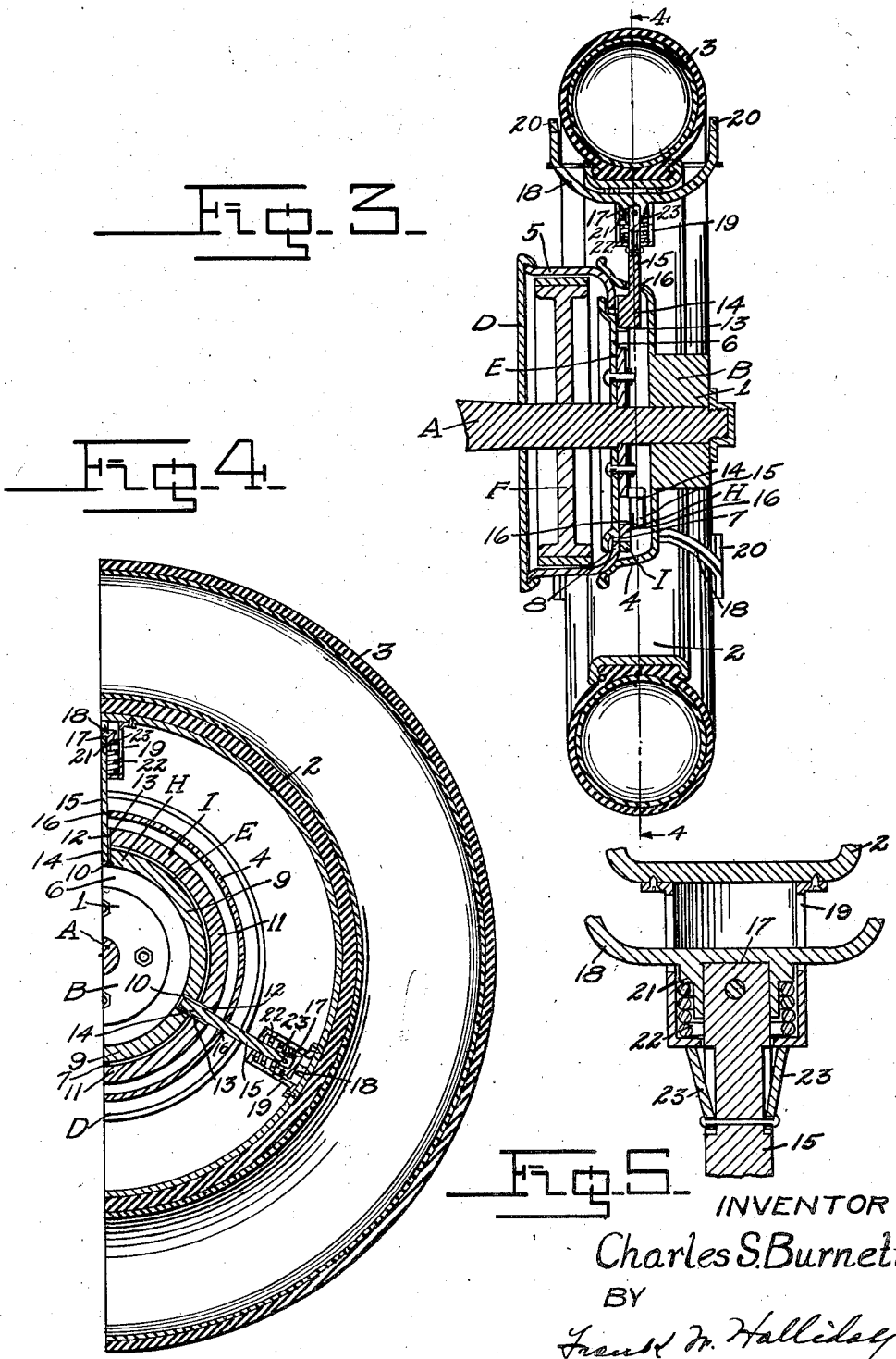

Patented Aug. 25, 1936

2,052,277

UNITED STATES PATENT OFFICE 2,052,277

SAFETY DEVICE FOR PNEUMATIC TIRE VEHICLES

Charles S. Burnett, Presidio of San Francisco, Calif.

Application April 1, 1936, Serial No. 72,062

9 Claims. (Cl. 301—6)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an attachment for wheeled vehicles equipped with pneumatic tires, and broadly it comprehends means for preventing the skidding and possible overturning of a vehicle due to a puncture, blowout or other sudden deflation of the tire, especially when the vehicle is traveling at a high rate of speed and when the tires are of large diameter.

One of the objects of this invention is to provide a safety device applicable to the wheels of an automobile, each device automatically functioning when a wheel has been disabled by sudden tire deflation to prevent the application of the braking force to the disabled wheel, thus materially reducing the accident hazard attributable to blowouts, punctures and the like.

Another object of this invention is to provide a wheel assembly having a brake drum embodying a trio of sections normally interlocked by a plurality of sliding keys, so that a braking force applied to the drum will be transmitted through the sections to the wheel, the keys being slidable to a position unlocking the several sections whenever the tire of the wheel has been deflated sufficiently to permit depression of a series of members coacting with and controlling the movement of the sliding keys.

Another object of this invention is to provide an automobile wheel assembly including a brake drum, the latter having a plurality of sections normally interlocked, but releasable by means coacting with the sections and controlled by the movement of a plurality of shoes arranged circumferentially of the wheel and on opposite sides of the tire, the impact of the shoes with the ground serving to release the sections of the brake drum and thus prevent transmission of the braking action from the drum to its wheel.

With these and other objects in view this invention consists in certain novel details of construction, combination and arrangement of parts to be more particularly hereinafter described and claimed.

Briefly stated, this invention comprises a conventional wheel assembly of the disc type, having a brake drum composed of inner, outer and intermediate sections, the outer and intermediate sections being equipped with a plurality of segments arranged in ring formation to provide the respective sections with adjacently disposed concentric rings having a trio of intercommunicating keyways adapted to receive a corresponding number of slidable keys which are formed on the lower ends of a series of radially extending actuating rods, the keys bridging the rings and in consequence interlocking the sections, and means in connection with the free extremities of the actuating rods and disposed with respect to the side walls of the tire so that its deflation causes said means to contact with the ground to actuate the rods, release the keys and unlock said sections to negative the braking force applied to the drum.

Referring more particularly to the accompanying drawings in which corresponding parts are indicated by similar reference characters:

Fig. 1 is a front elevation of an automobile front wheel assembly illustrating the application of the safety device forming the subject matter of this application;

Fig. 2 is a side elevation of an automobile wheel assembly illustrating the arrangement of the ground contacting shoes and their actuating rods;

Fig. 3 is a transverse vertical section taken on the line 3—3 of Fig. 2;

Fig. 4 is a fragmentary transverse vertical section taken on the line 4—4 of Fig. 3, and Fig. 5 is a fragmentary sectionalized detail of the mounting for the upper end of the actuating rods.

The sudden deflation of a tire coupled with the application of a uniform braking force applied to the wheel of the deflated tire and the corresponding opposite wheel carrying an inflated tire causes a swerving or skidding tendency, or deviation of the vehicle from its normal path of movement. This may result in overturning of the vehicle depending upon the rate of speed, the size of the tires and the drag developed between the deflated tire and the rod. It is therefore the aim and purpose of this invention to provide a comparatively simple arrangement, applicable to each of the wheels of an automobile and functioning to prevent the application of the braking force to the wheel when the tire of the latter has been suddenly deflated.

In the illustrated embodiment characterizing this invention, there is shown an axle A carrying a conventional wheel assembly B of the disc type and including a central portion (1), a rim (2), and pneumatic tire (3), as clearly shown in Figs. 2 and 3 of the drawings. Suitably associated with the central portion (1) of wheel assembly B is a brake drum assembly D composed of an inner section (4) and an outer brake shoe section (5) detachably interconnected through an interlocking assembly E, the outer brake shoe section (5) containing the usual brake shoe construction and its operating mechanism indicated by the reference character F.

Interlocking assembly E consists of an annular intermediate section (6) adapted to seat in an annular opening (7), formed in the inner wall (8) of the brake shoe section (5), as clearly shown in Fig. 3 of the drawings. Affixed to intermediate section (6) adjacent its periphery and in the form of a ring H, are a series of segments (9), the extremities of which are spaced as at (10) for a purpose hereinafter to appear.

Attached to the inner wall (8) of brake shoe section (5) adjacent the periphery of opening (7) and in the form of a ring I are segments (11) which are concentric with the ring H, as clearly shown in Fig. 4 of the drawings. The extremities of segments (11) are spaced as at (12), each spacing constituting a continuation of one of the spacings (10) in ring H, so as to provide through keyways (13), as clearly shown in Fig. 4 of the drawings. Slidably mounted in each keyway (13) is a key (14) each key being formed on the lower end of an actuating rod (15) which extends radially through an opening (16) in inner section (4) of the brake drum assembly, as clearly shown in Fig. 3 of the drawings.

The upper end of each actuating rod (16) is secured in a seat (17) formed centrally of a yoke (18) slidably mounted in a suitable guide casing (19) depending from the under side of felly (2), as clearly shown in Fig. 5 of the drawings. The free ends of yoke (18) are formed with arcuate shaped shoes (20), which are located adjacent the side walls of tire (3), slightly above and lateral of the sides of rim (2), as clearly shown in Fig. 3 of the drawings. The seat (17) of yoke (18) is formed with an annular shoulder (21) adapted to engage the upper end of a spring (22) normally functioning to hold the yoke in underlying relation with respect to the rim (2) of the wheel assembly, as shown in Fig. 3 of the drawings. In order to maintain the rods (15) in depressed position, they are formed at their upper ends with a series of seats in which are seated resilient element (23) which as the rods reach the limit of their depression movement spring outwardly and engage the undersurface of casing (19), as clearly shown in Fig. 5 of the drawings.

Normally keys (14) on the lower ends of actuating rods (15) being seated in keyways (13), and bridging rings H and I interlock the inner, outer and intermediate sections of the brake drum assembly so as to transmit the braking action from the brake drum to the wheel assembly as will be clearly understood without further discussion.

When by virtue of a puncture, or blowout, tire (3) is suddenly deflated, shoes (20) coming in contact with the ground as the wheel rotates, successively depresses the actuating rods (15) and in so doing displace keys (14) from their normal position bridging rings H and I, sufficiently to disengage ring I. unlock the several brake drum sections and permit independent rotation of the wheel. After the wheel and brake drum assembly have been disassociated the braking action applied to the drum can not be added to the dragging effect produced by the deflated tire, to augment the swerving tendency of the vehicle, as will be readily understood without further discussion.

In conclusion, it will be evident this invention provides a simple and inexpensive safety mechanism which will materially reduce the accident hazard incidental to high speed road travel by affording a certain amount of control to the vehicle despite the fact one of its wheels has been disabled by sudden tire deflation.

Having described my invention, what I claim as new and wish to secure by Letters Patent is:

1. The combination with a vehicle having pneumatic tired ground wheels, each wheel being equipped with a braking means including a brake drum formed in sections, the latter being normally interlocked to transmit the braking effect through the drum to the wheel; of means coacting with the sections and operable by ground contact to release the sections and negative the braking action through the drum.

2. The combination with a vehicle having pneumatic tired ground wheels, each wheel being equipped with a braking means including a brake drum formed in sections; of a mechanism normally interlocking the brake drum sections so as to transmit the braking effect through the drum, to the wheels, and means coacting with said mechanism and operable by ground contact to unlock the sections and permit rotation of the wheel independent of the drum.

3. The combination with a vehicle having pneumatic tired ground wheels, each wheel being equipped with a braking means including a drum formed in a plurality of sections, and mechanism associated with and normally interlocking the brake drum sections, said mechanism including a displaceable locking key, and means operable by ground contact and coacting with said key to effect its displacement and release said sections whereby to permit rotation of the wheel independent of the brake drum.

4. The combination with a vehicle having pneumatic tired ground wheels, each wheel being equipped with a braking means including a brake drum formed in sections and means interconnecting the brake drum sections, said means including concentric adjacently positioned rings having therein a keyway, a key slidable in the keyway and normally bridging the rings to interlock the sections, and means operable by ground contact and coacting with the key to effect its displacement, release the sections and permit rotation of the wheel independent of the brake drum.

5. The combination with a vehicle having pneumatic tired ground wheels, equipped with braking means including a brake drum formed in inner, outer and intermediate sections; and means normally interlocking the sections to transfer the braking effect through the drum to the wheel, said means including a pair of concentric rings adjacently mounted on the intermediate and outer sections of said drum, said rings having therein a plurality of keyways, keys slidably positioned in the keyways and normally bridging the rings to interlock said sections; of means operable by ground contact to displace the keys and release the drum sections, said means including a plurality of actuating rods extending through the inner sections of the brake drum, said rods being connected at their lower ends to the keys, and a plurality of shoes disposed adjacent the side of the tire and connected with the free ends of said actuating rods to operate the latter and displace the keys on deflation of the tire.

6. The combination with a vehicle having pneumatic tired ground wheels, each wheel being equipped with braking means including a brake drum formed in sections, and means normally interlocking the brake drum sections, said means including concentrically mounted adjacently positioned rings having therein a series of keyways, keys slidably positioned in the keyways to bridge the rings and normally interlock the sections; of means operable by ground contact and coacting with the keys to effect their displacement, release the sections and permit rotation of the wheel independent of the brake drum.

7. The combination with a vehicle having pneumatic tired ground wheels, each wheel being equipped with braking means including a brake drum formed in sections and means normally interlocking the brake drum sections, said means including concentrically mounted adjacently positioned rings having therein a keyway, a key slidable in the keyway and normally bridging the rings; of means operable by ground contact and coacting with the key to effect its displacement, release the sections and permit rotation of the wheel independent of the drum, said means including a radially extending actuating rod connected at one end to said key, a contact shoe disposed adjacent one side of the tire and immediately above the rim, and means interconnecting the shoe with the free end of said actuating rod.

8. The combination with a vehicle having pneumatic tired ground wheels, each wheel being equipped with braking means including a brake drum formed in sections and means normally interlocking the brake drum sections, said means including concentrically mounted adjacently positioned rings having therein a keyway, a key slidable in the keyway and normally bridging the rings; of means operable by ground contact and coacting with the key to effect its displacement, release the sections and permit rotation of the wheel independent of the drum, said means including a radially extending actuating rod connected at one end to said key, a pair of interconnected contact shoes disposed on opposite sides of the tire immediately above the wheel rim and means connecting the contact shoes with the free end of the actuating rod.

9. The combination with a vehicle having pneumatic tired ground wheels, each wheel being equipped with braking means including a brake drum formed in sections and means normally interlocking the brake drum sections, the said means including concentrically mounted adjacently positioned rings having therein a plurality of circumferentially spaced keyways, keys slidably positioned in the keyways and bridging the rings; of means operable by ground contact and coacting with the keys to effect their displacement, release the sections and permit rotation of the wheel independent of the drum, said means including a plurality of radially extending actuating rods, each rod being connected at one end to one of the keys, yokes affixed to the free ends of the actuating rods, the yokes underlying and extending transversely of the rim, contact shoes mounted on the free extremities of said yokes, the shoes being disposed immediately above the wheel rim adjacent to the side walls of the tire and in a plane parallel to said walls.

CHARLES S. BURNETT.